July 25, 1950  R. R. HAYS  2,516,383
HOSE TURNER
Filed Feb. 4, 1946  2 Sheets-Sheet 1
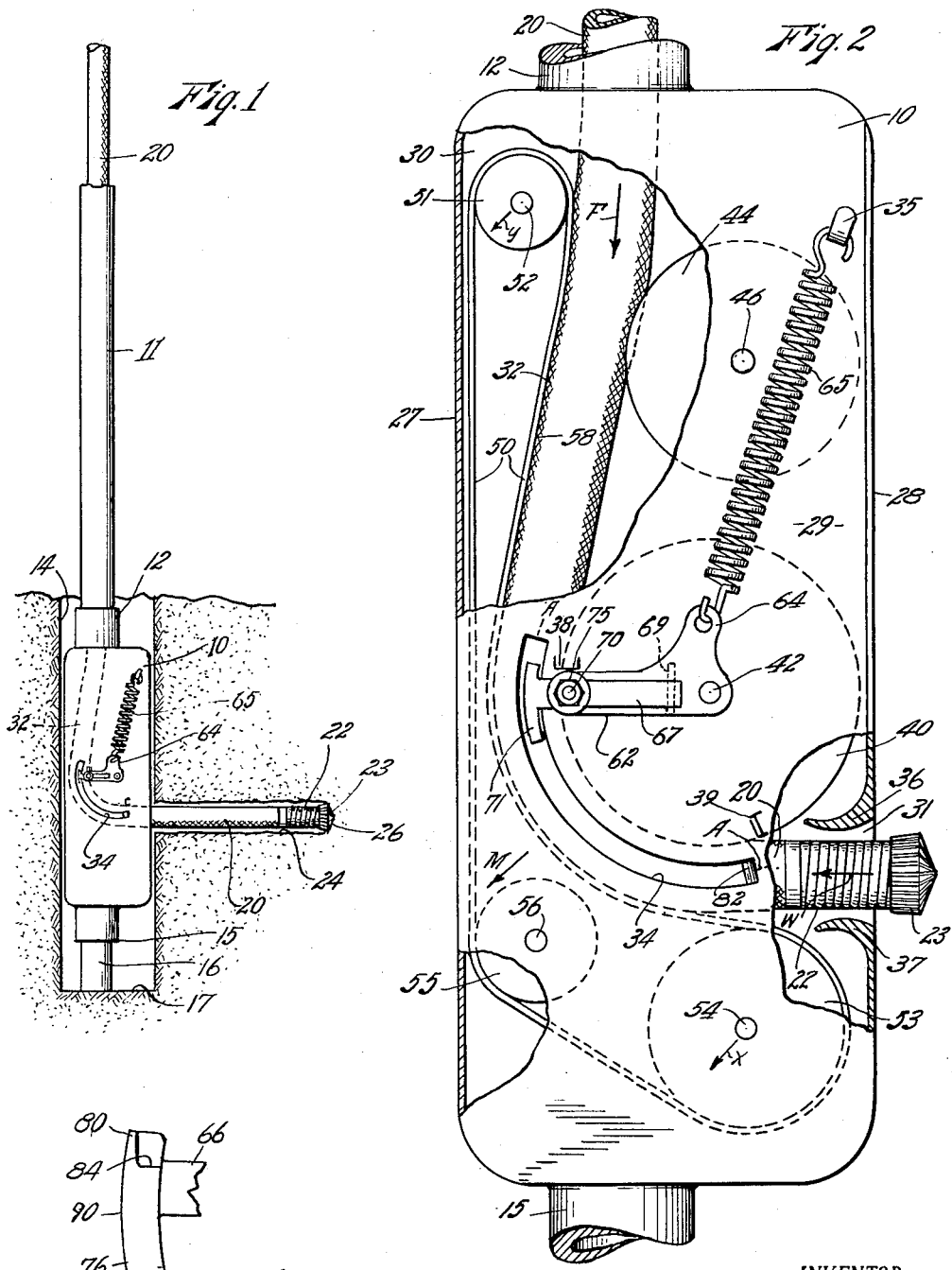
INVENTOR,
Russell R. Hays.
BY
Roy E. Hamilton,
Attorney.

July 25, 1950 R. R. HAYS 2,516,383
HOSE TURNER

Filed Feb. 4, 1946 2 Sheets-Sheet 2

INVENTOR,
Russell R. Hays.
BY Roy E. Hamilton,
Attorney.

Patented July 25, 1950

2,516,383

UNITED STATES PATENT OFFICE 2,516,383

HOSE TURNER

Russell R. Hays, Lawrence, Kans.

Application February 4, 1946, Serial No. 645,313

8 Claims. (Cl. 255—1.6)

This invention relates to well drilling apparatus and more particularly to improvements in mechanisms for extending a high pressure hose transversely from a vertical well bore in order that a cutting nozzle or drill carried on the extending end of the hose may be utilized for cutting horizontal drainage channels; being a continuation in part of, co-pending application Serial No. 604,964 for a Hydraulic Engine, filed July 13, 1945, now Patent Number 2,441,881.

Since many oil wells are finished with 4½ inch to 4¾ inch holes in the producing stratum, it follows that the radius of the arc through which the hose must be turned through 90° to be effective in such wells will under optimum conditions be around 4 inches. At the same time, a hose having satisfactory rigidity and fluid carrying capacity for this work will rarely have an O. D. of less than ⅞ inch, which allowing for a 10% expansion under pressure gives a diameter substantially ¼ the radius of curvature. Under normal operating conditions, however, no such optimum figure exists. This is because the cutting nozzle or drill must be horizontally positioned before beginning the cut. An allowance of 1½ inches to 2 inches must be made for this horizontal positioning of the drill, with the result that the actual radius of the arc of curvature is usually 3 or less times the diameter of the hose to be turned.

When it is further considered that to provide sufficient clearance between the fluid supply hose and the drainage lateral for the exhausted fluid stream to effectively flush the cuttings from the hole, the diameter of the cutting head should be at least 20% greater than the hose by which it is carried, and that this head must also pass freely through the hose turning mechanism, the complexity of the problem presented will be more readily appreciated. Since friction arising with turning of the direction of force acting to extend the hose from the vertical to the horizontal, centers in the turning mechanism and as such must be added to the initially imposed vertical force feeding the hose into the lateral, it will be apparent that uniform friction components are essential in maintaining cutting pressures. Reduction of these friction components to a minimum is also imperative for successful operation.

In examining the mechanism used for turning a fluid supply hose in this manner, three distinct operating conditions are observable:

(1) Getting the nozzle or cutting head to feed smoothly through the hose turner mechanism presents a particular problem since its resistance to turning causes it to dig in or nose out toward the outside of the arc. Because of its larger diameter and the yieldability of the hose this digging in effect is so great that it is impossible to force such a head through a smooth curved conduit of small dimensions.

(2) When the hose is being fed horizontally away from the main drill hole, any resistance it encounters acts at right angles to the vertically imposed feeding force with the result that the hose is compressed in and against the back of the turning conduit. When the hose is in contact with a fixed surface at this time, the friction at this point of contact becomes so great that relatively small resistance is sufficient to stick it.

(3) When the hose is being withdrawn from the hole the directions of force are all reversed. At this time the friction imposed on the turning mechanism is toward the inside of the turning arc and hence may readily be handled by either a simple roller or an arcuate series of rollers disposed inside the arc of curvature.

With these considerations in mind the objects of this invention are:

(1) The provision of a mechanism for turning a high pressure hose through a 90° arc inside a well bore and horizontally positioning a nozzle or drilling device carried on the extending end of the hose for projection against the formation to be cut.

(2) The provision of a hose turning mechanism in which an endless belt traveling with the hose and supporting its outer face during its passage through the turning mechanism transfers the friction normal to this turning to rollers carrying the belt and lying outside the immediate arc of curvature of the hose.

(3) The provision of a hose turning mechanism in which a slack belt carried on rollers lying outside the turning arc limits the bend which can be imposed upon the hose by feeding pressures.

(4) The provision of a hose turning mechanism in which a slack belt carried on rollers lying outside the turning arc permits transfer of normal turning friction loads from a point adjacent the back wall of the turner case to the pivots of the rollers supporting the belt and lying well inside the turning mechanism.

(5) The provision of a hose turning mechanism in which the side walls of the turning mechanism serve as side guides for a slack belt, carried by rollers mounted inside the turner, to prevent the belt running off these rollers, and also serve to prevent lateral deflection of the hose and its running off the belt while passing through the turner.

(6) The provision of a hose turning mechanism in which a single, flanged roller lying inside the arc of curvature of the turned hose and wholly within the turning mechanism carries the hose during withdrawal from the well and while it is making a turn of substantially 90°.

(7) The provision of a hose turning mechanism in which a flanged turning roller lying inside the arc of curvature of the turned hose and wholly within the turning mechanism permits horizontal alignment of a section of the hose while inside of the turning mechanism, with lateral drainage channels extending from a main drill hole.

(8) The provision of a hose turning mechanism in which flanged rollers placed on the inside of the arc of curvature of the hose in passing through the turner act to guide and maintain the hose upon an endless belt effective against the back side of the hose.

(9) The provision of a hose turning mechanism in which a pivoted clamp picks up the end of the hose, or the nozzle carried by it, after entry into the turner and maintains the nozzle in alignment with the centerline of the normal arc of curvature of the hose in the turner while carrying the nozzle through a 90° arc, after which it automatically drops the nozzle in position for horizontal extension from the turner.

(10) The provision of a carrying device for a drill head mounted on a high pressure hose during passage through a 90° arc in a hose turner in which paired pawls carried on arms pivoted at the center of the circle of which the arc is a part, project through paired slots in the sides of the turner case and into the curved passageway normally occupied by the hose to pick up the drill head carried by the hose and carry it in alignment with the center line of this passageway through a 90° arc until oblique faces of the pawls simultaneously contact the lower ends of the slots to spread the pawls and thus release the drill head for horizontal extension.

(11) In a drill head carry of the character described, the provision of paired pawls maintained in the passageway of a hose turner by spring tension with sufficient distance between them to permit free passage of the hose yet at the same time to pick up a drill head or nozzle carried by the hose and having a slightly greater diameter than the hose, and the provision of suitable stops to limit travel of the pawls so that they automatically disengage from the drill head at the bottom of a 90° arc when the hose is being extended into the well, and at the top of this same arc when the hose is being withdrawn from the well.

(12) In a drill carry of the character described, the provision of paired arms carrying paired pawls in which tension means fastened to the arms tends to maintain them in a horizontal position and resists the feeding force on the drill head picked up by the pawls and forcing the carry arms through a 90° arc at the lower end of which the pawls disengage from the drill head, after which the tension means then acts to return the carry arms to their initial horizontal position.

Ancillary objectives such as the provision of suitable pawls faces on the drill head pick-up, the housing of the hose turning mechanism in a suitable case and the like, will become clearer from reading the following description taken in conjunction with the drawings in which:

Figure 1 is a diagrammatic view in side elevation of a hose turner such as that embodied in this invention, mounted upon tubing and positioned in a well bore for horizontally extending a drill carried on a high pressure hose.

Fig. 2 is an enlarged diagrammatic elevational view of the hose turner with sections cut away to more clearly present its operation.

Fig. 7 is an enlarged end view of a pawl face showing the pick-up tooth and throwout face.

Figure 3:
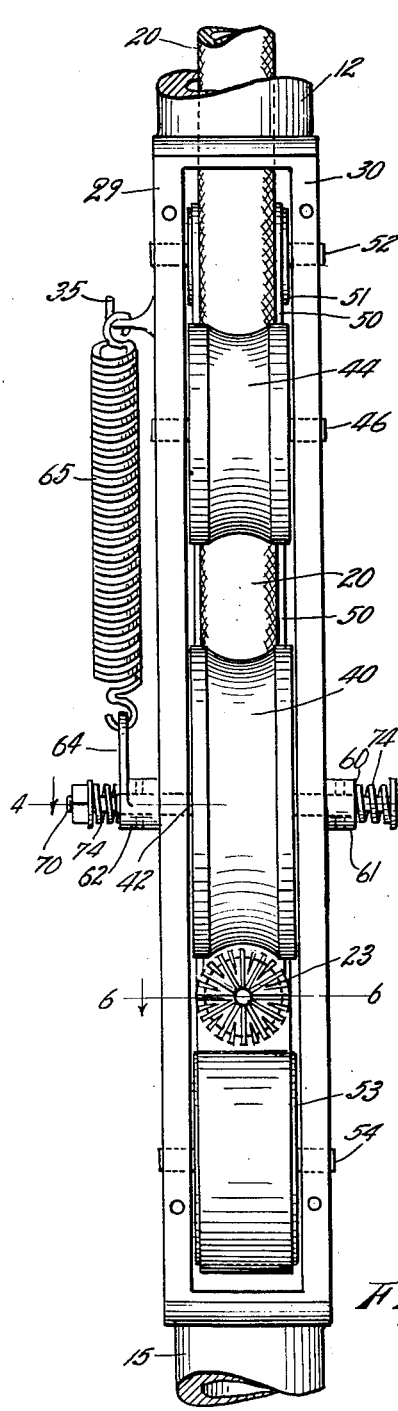
Fig. 3 is an enlarged edge elevational view of the hose turner with the lid of the case removed.

Referring to the figures, a hose turner 10, Fig. 1, is run into a well bore 14 on a string of tubing 11 fixed to the collar 12 carried at the top of the turner in a manner generally similar to that described in Patent No. 2,345,816 in which provision is made to extend a high pressure fluid supply hose 20 carried inside of tubing 11 down into the hose turner 10. An anchor 16 fixed in the collar 15 carried on the lower end of turner 10 is of such length that it will support the turner 10 opposite the stratum 26, as for instance a fluid bearing sandstone, into which drainage laterals 24 are to be cut by a hydraulically operated drilling engine 22 such as that described in co-pending application Serial No. 604,964 carried on the extending end of the fluid supply hose 20.

The case of the hose turner 10 comprises a flat welded steel box made of steel plates 29 and 30 having a width slightly less than the diameter of the well bore 14 and being spaced a distance apart slightly greater than the diameter of the drill head 23 of the water engine 22 to permit passage of the drill head freely between them. These plates are weldd on spacers at top and bottom and to the tubing collars 12 and 15, and provide the structural strength required in the case to support the tubing string 11 carried above it. In order to give the case the maximum cross-sectional length, a relatively light plate 27 is welded to the rear edges of plates 29 and 30 to form the back of the case, and a similar plate 28 is screwed to the front of the side plates to form a removable lid at the front of the case.

The lateral opening 31 from which the water drill 22 is extended horizontally passes through the case lid 28, and immediately behind it and mounted on the side plates 29 and 30 are hose guides 36 and 37 which comprise the horizontally disposed outlet of hose passageway 32 through the turner 10. Since a hose nozzle or a water drill 22 such as is contemplated for use with the hose turner 10 must be positioned substantially horizontally before beginning a cut, it follows that the lower opening of passageway 32 must be straight for a distance after turning through a 90° arc, sufficient to accommodate the water drill in this position. For this reason the arc A—A of turning, Fig. 2, taken along the centerline of the hose 20, must begin back from the lid 28 of the case 10, by this amount: i. e., substantially three-fourths the length of the water drill 22, and its maximum radius of curvature will then be determined by the distance from this point to the back of the box less the radius of the hose 20 and the space required for free travel of the slack belt 50. The radius of the arc A—A less the radius of the hose 20, when designed substantially equal to the length of the water drill 22 by varying the diameter of the hose 20 that is used with a given turner, gives the maximum radius of the flanged pulling roller 40 mounted on shaft 42 journaled at its ends in the case plates 29 and 30.

With the radius of curvature of the arc A—A determined, positioning of the belt rollers 51, 53 and 55 mounted upon shafts 52, 54 and 56 respectively, the ends of which are journaled in suitable bearings in the case plates 29 and 30, is comparatively simple. The forward face 58 of the endless belt 50, preferably made of rubber impregnated fabric, and having a width substantially equal to the diameter of the drill head 23, is designed to loosely support hose 20 when passing around flanged or grooved pulley 40 through at least 90° of this arc and as much thereafter as is necessary to suitably accommodate the belt rollers 51, 53 and 55 inside the turner case. The general requirements in the position of these rollers are that roller 53 be spaced back from the case lid 28 a distance substantially equal to the distance required for horizontally positioning the water drill 22. The roller 55 serves primarily to maintain the rear face of the belt 50 adjacent the rear plate 27 at the bottom of the case 10. The roller 51 serves a similar purpose at the top of the case and also changes the direction of travel of the belt 50. Roller 51 is preferably made as small as free turning of the belt will permit to decrease the length of the turning arc A—A to a minimum, whereas roller 53 is made as large as space will permit to smooth the travel of drill head 23 over it.

Since roller 51 is positioned well above hose pulley 40 and adjacent the upper end of the passageway 32 where it enters into the collar 12, it is evident that a guide of some sort is required on the opposite side of the passageway 32 to force the hose over on to the belt 50. Such a guide is provided by flanged roller 44 mounted on shaft 46 journaled in the side plates 29 and 30. Although fine adjustments in the tension of belt 50 are not required after it has been put into operation, a conventional belt tightener having vertical travel is usually installed between belt roller 51 and the case 10, to expedite the initial tension adjustment of belt 50.

The head carry assembly 60, the sole function of which is to initially guide the drill head 23 through the curved passageway 32 of the hose turner 10, includes a pair of arms 61 and 62 mounted on opposite ends of the pulling pulley shaft 42 and solidly secured thereto by pins 63 so that they swing freely with shaft 42 outside of the turner case 10 and in radial alignment with each other. The outer faces of arms 61 and 62 are recessed to receive pawls 66 and 67 pivotally mounted therein on pins 68 and 69 respectively to permit limited transverse travel to the swinging path of the arms 61 and 62. Bolts 70 welded inside arms 61 and 62 pass through oversized holes 72 in pawls 66 and 67 and carry coiled springs 74 and tension adjustment nuts 75 so that pawls 66 and 67 are normally held firmly in arms 61 and 62 against outer surfaces 78 of said arms.

Figure 5:
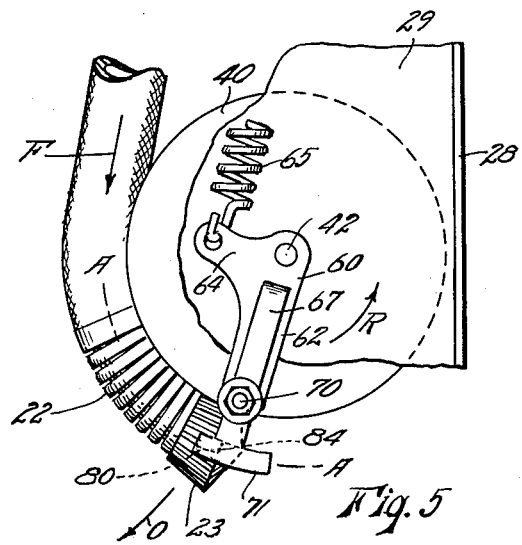
Fig. 5 is a diagrammatic view illustrating the forces acting on the head carry arms during the carrying of the drill head through a 90° arc.
Figure 4:
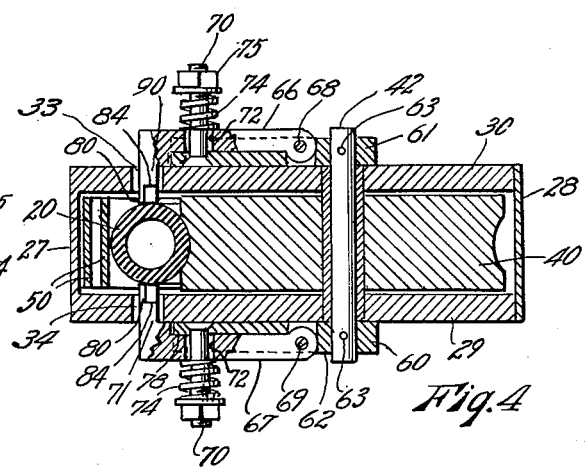
Fig. 4 is a cross sectional view taken along the line 4—4 of Fig. 3 in the direction of the arrows, showing the details of the head carry arms and pawls, and with some of the parts in elevation.
Figure 6:
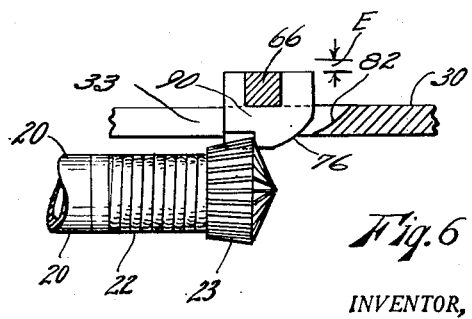
Fig. 6 is an enlarged diagrammatic view taken along the line 6—6 of Fig. 3 illustrating the automatic release of the head carrying pawls upon contact with the lower ends of the case slots.

The forward ends of pawls 66 and 67 are bent inward to form fingers 90 and 71 respectively which pass through curved slots 33 and 34 in the side walls of the turner case 10 in alignment with the hose turning arc A—A, being spaced a distance apart in the case slightly greater than the diameter of the fluid supply hose 20 to permit its passage freely between them, yet at the same time projecting into the turner case sufficiently to catch the toothed sides of the cutting head 23 back of its maximum cross-section as illustrated in Figs. 5 and 6, the upper faces of pawl fingers 90 and 71 being recessed to form teeth 80, Fig. 7, and the lower faces being swept back to form throwout faces 76. A flange 64 on the arm 62 receives the end of coil spring 65 held under tension by case hook 35 securing its other end and normally maintains the outer end of arm 62 securely against case stop 38 to hold the carry assembly in a horizontal position. Case stop 39 prevents downward swinging of assembly 60 against spring tension T through a distance slightly more than 90°, but the assembly normally never contacts this stop since with downward carry of the head 23 throwout faces 76 of the fingers 90 and 71 contact the canted ends 82 of slots 33 and 34 to compress springs 74 and thus force pawl fingers 90 and 71 out a distance E, bringing them flush with the inside walls of hose turner case 10, and thereby releasing drill head 23 after which the tension T of spring 65 returns the carry assembly 60 to its initial horizontal position. With pulling of the hose 20 from the turner 10, the drill head 23 again contacts the pawl fingers 90 and 71 but this time against the throwout faces 76 with the result that the assembly 60 being restrained from upward travel by case stop 38, springs 74 are again compressed to permit passage of the head 23 between the pawl fingers 90 and 71.

In operation the turner case 10 is positioned in a conventional fashion opposite the formation into which drainage laterals are to be cut, and the high pressure hose carrying the water drill 22 is run down the tubing 11 into the top of the hoser turner case. Being thus initially directed between the inside face 58 of the turner belt 50 and the flanged guide pulley 44, the feeding force F carries the head on down between the belt face 58 and the pulling pulley 40 the face of which pushes the drill sufficiently out of vertical alignment with the tubing 11 that the drill head 23 lies against the face of the pulley 40 at the time it contacts the carry fingers 90 and 71, passing down between the teeth 80 and the pulley face until it contacts stops 84 at the base of teeth 80. With contact of head 23 against stops 84, the feeding force F acts to push the ends of the carry assembly 60 downward against the tension of assembly spring 65, the fingers 90 and 71 freely following case slots 33 and 34.

As continued feeding pressure F forces the hose and head 23 downward against spring tension T, the head 23 is deflected from its vertical path to follow the arc of curvature A—A and a new force comes into effect. This is the couple O, Fig. 5, represented by the natural rigidity of the engine 22 and hose 20 which is opposed to lateral deflection occurring with turning through the arc A—A, and tending to pull the head 23 from the pawl fingers 90 and 71. The couple O thus becomes a tension load effective through the arms 61 and 62 and sustained by the pulley shaft 42. It may also act to spread the pawl fingers 90 and 71 against the tension of springs 74 and thus permit the head to kick loose. To prevent this happening, advantage is taken of the fact that with the drill heads 23 side drainage slots permit teeth 80 to contact substantially flat surfaces so that the couple O cannot act against inclined surfaces and thus be converted to a force opposed to the tension of pawl springs 74. Where abrasive nozzles form the cutting head 22 of the hose instead of a water drill, similar drainage slots may be made in the nozzle to permit teeth 80 to more easily hold it.

Escape of the head 23 from the fingers 90 and 71 being otherwise resisted by the tension of spring 65, the head and following hose is carried down through the arc A—A in the direction R until the finger faces 76 contact the slot ends 82 to release the drill head, after which the assembly 60 is returned by spring 65 to its initial position. The drill head meanwhile has dropped to the belt 50 passing over roller 53, being tightly maintained in this position through the tension of belt 50 holding the turned hose against the grooved face of pulling pulley 40. It will be observed, Fig. 2, that the top of roller 53 is slightly ahead of the bottom of pulley 40, hence at the time the head 23 drops on belt 50 after passage through arc A—A it actually is tilting upward sliightly. However, with forward extension, it kicks down after clearing the belt 50 and the engine 22 moves forward in a true horizontal position before clearing the turner case to contact the face of the formation 26.

A high pressure fluid stream is then pumped into the fluid supply hose 20 from suitable installations at the surface, and cutting with the drilling engine 22 begun. As the supply hose 20 is forced through the hose turner 10 with cutting of a lateral drainage channel, the endless belt 50 turning on rollers 51, 52 and 53 moves with it as does the pulley 40 when the drill head 23 is moving through an open hole. However, when the head is cutting, a feeding pressure of between 10 to 20# p. s. i. is normally required and this plus the drag of the hose 20 in the lateral 24 together with the friction of the exhausted fluid stream passing between the hose and the lateral 24, is reflected as a horizontal force W, Fig. 2, resisting the vertical feeding pressure F. At such times the hose 20 clears the pulley 40, and it is at these times that the use of a turner belt 50 becomes particularly effective. The resultant of the forces W and F is seen as a force M tending to decrease the radius of the arc of curvature A—A and to compress the hose 20; i. e., expand it to fill the curved passageway 32. However, since the force M is directly resisted by the tension of the belt 50, it is transferred as forces X and Y effective upon roller shafts 54 and 52 respectively. This is highly advantageous, since the force M being more or less evenly distributed throughout the arc A—A is taken evenly throughout this arc by the belt 50.

This even distribution of the force M over the belt 50 has two direct benefits. For instance, where an arcuate series of rollers are used in place of a belt, the surface of hose 20 when under compression tends to push down into the spaces between the roller tops and thus greatly increases the friction generated during its passage over them. The second feature is that to impose rollers uniformly between the hose and the back wall of the turner case 10 greatly decreases the space available in which to turn the hose 20, thus directly decreasing the radius of curvature of the turning arc A—A, which in turn calls for a decrease in the diameter of the hose 20, and hence to a corresponding decrease in the diameter of the drainage channel 24 that can be cut for a given side of well bore.

Since wide adaptations of such a hose turner may be made without departure from the principles disclosed, what is claimed is:

1. In apparatus for extending a flexible conduit through a 90° arc, a case containing a curved passageway, an endless belt mounted on rollers journaled inside of said case and lying outside of said passageway, flanged rollers mounted inside of said case and forming the inner wall of said passageway, inside faces of said case forming the side walls of said passageway, said belt having a width substantially equal to the width of said passageway whereby the inside faces of said case serve as guides to maintain the centerline of said belt in alignment with the centerline of said passageway.

2. In a hose turning mechanism, the combination of a high pressure hose carrying a nozzle having a greater cross-section than the diameter of the hose, with a hose turning case containing a passageway making a 90° arc and having a cross-section slightly greater than the diameter of the nozzle, means for causing the hose and nozzle fixed thereto to pass freely through said curved passageway including paired pawls extending into said curved passageway from either side of said case and spaced a distance apart slightly greater than the diameter of the hose but less than the diameter of the nozzle, whereby said nozzle is maintained in alignment with the center line of said passageway during passage therethrough.

3. In a hose turning mechanism of the character described, a pair of pivotally mounted pawls, stops to limit the travel of said pawls to an arc of 90°, and variable tension means operably associated with said pawls to pick up and to carry the nozzle of a high pressure hose through said 90° arc and to automatically release said nozzle at the end of said arc.

4. In a hose turning mechanism of the character described, paired pivotally mounted arms describing a 90° arc, yieldable pawls mounted on said arms for carrying a hose nozzle through said arc, tension means operatively associated with said arms resisting downward travel of said arms, and stops to limit the upward travel of said arms in response to said tension means.

5. In a hose turning mechanism of the character described, a nozzle carrying device including paired tension loaded pawls projecting into a curved passageway, and pawl faces the upper ends of which form fingers for picking up a hose nozzle, and the lower ends of which form inclined throwout surfaces for automatically disengaging said fingers.

6. In a hose turning mechanism of the character described, means for carrying a hose nozzle through a 90° arc including paired pivotally mounted arms, paired pawls pivotally mounted on said arms for transverse travel thereto, stops for limiting the travel of said pawls inwardly with respect to the case upon which said arms are mounted, and variable tension means restraining outward movement of said pawls with respect to said arms.

7. In a hose turning mechanism of the character described, a flat vertically disposed hose turning case communicating with a string of tubing for positioning said case in a well bore, a curved passageway in said case, curved slots in the side of said case communicating with said curved passageway through a 90° arc, means mounting paired hose nozzle carrying pawls for travel in said slots, and means permitting automatic disengagement of said pawls with said nozzle at either end of said slots.

8. In apparatus for turning a flexible conduit through a 90° arc, a case containing a curved passageway, an endless belt mounted on rollers journaled inside of said case and laying outside of said passageway, flanged rollers mounted inside of said case and forming the inner wall of said passageway, inside faces of said case forming the side walls of said passageway, curved slots in the sides of said side walls, and means operable in said slots to maintain the end of a conduit projected through said passageway in alignment with the centerline of said passageway during its projection therethrough.

RUSSELL R. HAYS.

REFERENCES CITED

The following references are of record in the file of this patent:

UNITED STATES PATENTS

| Number | Name | Date |
|---|---|---|
| 1,552,161 | Houghton | Sept. 1, 1925 |
| 2,179,094 | Joss | Nov. 7, 1939 |
| 2,345,816 | Hays | Apr. 4, 1944 |

FOREIGN PATENTS

| Number | Country | Date |
|---|---|---|
| 56,345 | Norway | Mar. 23, 1936 |